United States Patent
Filev et al.

(10) Patent No.: US 10,239,529 B2
(45) Date of Patent: Mar. 26, 2019

(54) AUTONOMOUS VEHICLE OPERATION BASED ON INTERACTIVE MODEL PREDICTIVE CONTROL

(71) Applicant: Ford Global Technologies, LLC, Dearborn, MI (US)

(72) Inventors: Dimitar Petrov Filev, Novi, MI (US); Jianbo Lu, Northville, MI (US); Davor D. Hrovat, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 116 days.

(21) Appl. No.: 15/057,233

(22) Filed: Mar. 1, 2016

(65) Prior Publication Data

US 2017/0253241 A1  Sep. 7, 2017

(51) Int. Cl.
  *B60W 10/04* (2006.01)
  *B60W 10/20* (2006.01)
  (Continued)

(52) U.S. Cl.
  CPC ............ *B60W 30/18* (2013.01); *B60W 10/04* (2013.01); *B60W 10/18* (2013.01);
  (Continued)

(58) Field of Classification Search
  None
  See application file for complete search history.

(56) References Cited

U.S. PATENT DOCUMENTS

2007/0225882 A1* 9/2007 Yamaguchi ......... B60W 30/095
  701/36
2010/0057361 A1* 3/2010 Caveney ............... B60W 30/08
  701/301

(Continued)

FOREIGN PATENT DOCUMENTS

WO   WO 2014147361 A1   9/2014

OTHER PUBLICATIONS

Falcone, P., et al, "A Linear Time Varying Model Predictive Control Approach to the Integrated Vehicle Dynamics Control Problem in Autonomous Systems," Proceedings of the 46th IEEE Conference on Decision and Control, New Orleans, LA, Dec. 12-14, 2007.

(Continued)

*Primary Examiner* — Jonathan M Dager
*Assistant Examiner* — Garrett F Evans
(74) *Attorney, Agent, or Firm* — Frank A. McKenzie; Bejin Bieneman PLC (57) ABSTRACT

A system includes a computing device programmed to receive a set of goals for a vehicle and identify a travel area for the vehicle for a time period. The computing device receives data indicating predictability of driving conditions of the travel area and determines that the predictability is sufficient to control the vehicle according to model predictive control. Controlling the vehicle includes determining instructions to control actuators related to the steering, propulsion and braking of the vehicle to minimize a cost function. The instructions are implemented for a first time slot. The time period is updated to remove the first time slot (Continued)

at the beginning and include an additional time slot at the end of the predetermined time period. The computing device determines an updated control solution, and implements the updated control solution for a second time slot.

18 Claims, 5 Drawing Sheets

(51) Int. Cl.
*B60W 30/18* (2012.01)
*B60W 10/18* (2012.01)
*G05D 1/00* (2006.01)
*B60W 50/00* (2006.01)
*B60W 10/184* (2012.01)
*B60W 40/04* (2006.01)
*G08G 1/0967* (2006.01)

(52) U.S. Cl.
CPC .......... *B60W 10/184* (2013.01); *B60W 10/20* (2013.01); *B60W 40/04* (2013.01); *B60W 50/0097* (2013.01); *G05D 1/0088* (2013.01); *G08G 1/09675* (2013.01); *G08G 1/096725* (2013.01); *G08G 1/096741* (2013.01); *G08G 1/096775* (2013.01); *G08G 1/096791* (2013.01); *B60W 2550/408* (2013.01); *G05D 2201/0213* (2013.01)

(56) References Cited

U.S. PATENT DOCUMENTS

| | | |
|---|---|---|
| 2010/0228420 A1 | 9/2010 | Lee |
| 2014/0297116 A1 | 10/2014 | Anderson et al. |
| 2015/0039206 A1 | 2/2015 | Storch et al. |
| 2015/0158528 A1 | 6/2015 | Moshchuk et al. |
| 2017/0132934 A1* | 5/2017 | Kentley ................ G08G 1/202 |
| 2017/0363430 A1* | 12/2017 | Al-Dahle ............... G01C 21/32 |

OTHER PUBLICATIONS

Yoon, Yongsoon, et al., "Model-predictive active steering and obstacle avoidance for autonomous ground vehicles," Control Engineering Practice, vol. 17, Issue 7, Jul. 2009, pp. 741-750.

* cited by examiner

AUTONOMOUS VEHICLE OPERATION BASED ON INTERACTIVE MODEL PREDICTIVE CONTROL

BACKGROUND

Interactive Model Predictive Control (iMPC) is an effective control technology that can systematically take into account the current and future state of the vehicle, and system operating constraints, and provide an optimal control function with respect to fuel economy, drivability and performance. IMPC optimizes all propulsion, steering and braking actuators by taking into account the interactions between vehicle subsystems. The use of iMPC assumes, however, predictability of the vehicle environment. Autonomous vehicles operating in a predictable environment may benefit from the application of iMPC.

DESCRIPTION

Introduction

Figure 1:
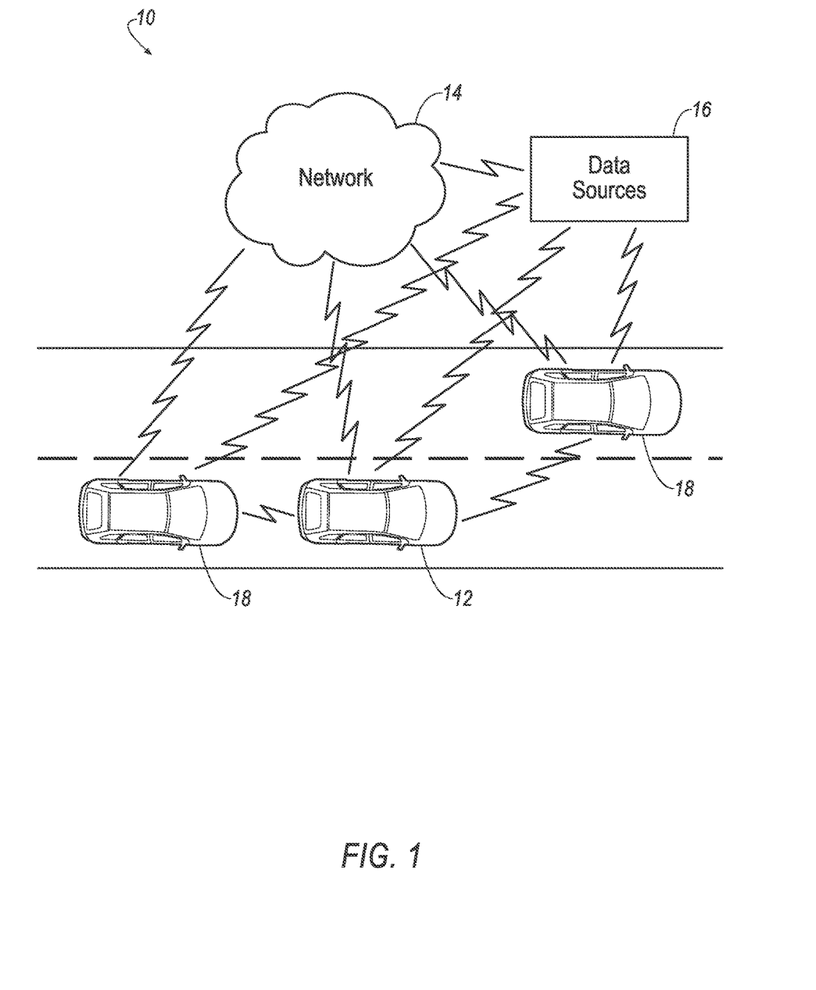
FIG. 1 is diagram of a system for implementing interactive Model Predictive Control (iMPC) for a first autonomous vehicle operating on a highway.

A system 10, as shown in FIG. 1, includes a first autonomous vehicle 12, a network 14 and one or more data sources 16. The system 10 may further include one or more second vehicles 18 which may be autonomous vehicles, semi-autonomous vehicles or conventional vehicles. The first autonomous vehicle 12 may include a computer 20 (FIG. 2) programmed to determine a predictability of the environment in which the first vehicle 12 is operating, and may select to implement interactive Model Predictive Control (iMPC) in a case that the predictability is sufficiently high. Hereinafter, an environment whose predictability is sufficiently high for implementation of iMPC will be referred to as a sufficiently predictable environment. Predictability of the environment may be sufficiently high, for example, in a case that there are no pedestrians, animals, bicycles or second vehicles 18 proximate to the first autonomous vehicle 12. As another example, the predictability of the environment may be sufficiently high in a case that the environment does include second vehicles 18, and the behavior of the second vehicles 18 can be predicted by the computer 20 in the first vehicle 12. As described in additional detail below, second vehicles 18 whose behavior can be predicted by the computer 20 in the first vehicle 12 may include autonomous vehicles 18, and may further include conventional or semi-autonomous vehicles 18 whose behavior is within a predetermined range of behaviors. For example, the predetermined range of behaviors may include a range of velocities, a range of steering angles, a range of positions, and a range of accelerations. The computer 20 may determine that the behavior of the second vehicle 18 is predictable as long as the second vehicle 18 is operating within the predetermined range.

The first vehicle 12 computer 20, upon determining that the first vehicle 12 is operating within a sufficiently predictable environment may select to control operation of the first vehicle 12 based on an interactive Model Predictive Control (iMPC) methodology.

System Elements

Referring in additional detail to FIG. 1, an exemplary system 10 for implementing Model Predictive Control includes the first vehicle 12, zero or more second vehicles 18, a network 14, and zero or more data sources 16. The first vehicle 12 is an autonomous vehicle which includes one of more autonomous modes of operation. The second vehicles 18 may be conventional, semi-autonomous or fully autonomous vehicles 18.

Figure 2:
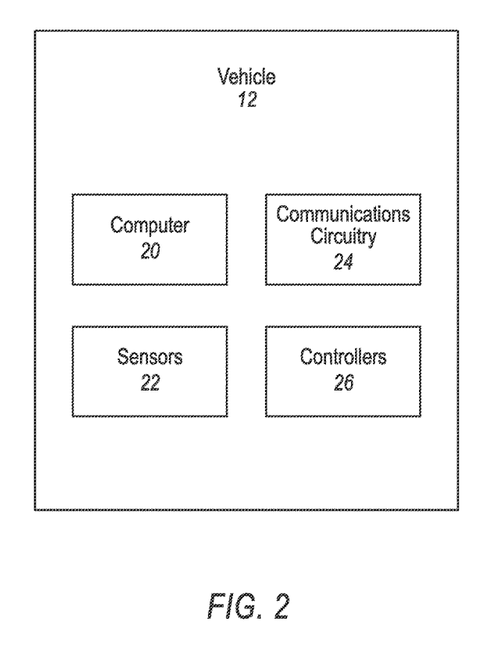
FIG. 2 is a block diagram of an exemplary first autonomous vehicle programmed to implement iMPC for the system of FIG. 1.

The first vehicle 12 is generally a land-based first vehicle 12 having three or more wheels, e.g., a passenger car, light truck, etc. As described in additional detail below, and as seen in FIG. 2, the first vehicle 12 includes a computer 20. The computer 20 may be programmed to autonomously control propulsion, steering and braking of the first vehicle 12. The computer 20 may implement, depending on the perceived level of predictability of the environment, different control methodologies. Examples of control methodologies include maintaining the vehiclespeed with respect to a predefined speed profile with the capability of adjusting to the traffic conditions ahead, steering the vehicle to negotiating a curved road segment with the capability of adjusting the steering to handle the sudden obstacle avoidance need, etc. In the case that the computer 20 determines that the environment is sufficiently predictable, the computer 20 may implement an iMPC based methodology. As described in additional detail below, the computer 20 can, according to the iMPC methodology, optimize an operation of the first vehicle 12 based on a set of goals.

The network 14 represents one or more mechanisms by which the vehicles 12, the vehicles 18, and the data sources 16 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks, local area networks (LAN) and/or wide area networks (WAN), including the Internet, providing data communication services, vehicle-to-vehicle communication mechanisms such as those using dedicated short range communication (DSRC) technology or those using long term evolution direct (LTE-D) technology. A network using LTE-D can, for example, permit the discovery of thousands of devices within a given range, e.g., 500 meters, which can thus permit a multitude of LTE-D devices in an area of the vehicle 12 to communicate within the network 14.

Data sources 16 may be systems such as global positioning systems, traffic tracking systems, weather tracking systems, etc., and may provide data related to an operating condition of the first vehicle 12 and second vehicles 18. The data source 16 may be programmed, for example, to generate and provide map data, weather data, geo-coordinates (e.g., latitude, longitude), traffic data, etc. as is known, to the first vehicle 12 and second vehicles 18.

Referring again to FIG. 2, the first vehicle 12 includes one or more sensors 22 that are provided to collect data related to the first vehicle 12 and the environment in which the first vehicle 12 is operating. By way of example, and not limitation, sensors 22 may include e.g., thermometers, barometers, humidity sensors, altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, Global Positioning System (GPS) antenna and receivers, etc. The sensors 22 may be used to sense the environment in which the first vehicle 12 is operating such as weather conditions, the grade of a road, a curvature of a road, a surface friction condition of a road, a traffic condition, second vehicles 18, etc. The sensors 22 may further be used to collect dynamic data related to operations of the first vehicle 12 such as velocity, yaw rate, acceleration, deceleration, steering wheel angle, engine speed, brake pressure, oil pressure, the power level applied to drive the first vehicle 12, etc.

The one or more controllers 26 for the first vehicle 12 may include known electronic control units (ECUs) or the like including, as non-limiting examples, one or more engine controllers, one-or-more transmission controllers, one or more power steering controllers, one or more brake controllers, one or more suspension controllers, etc. Each of the controllers 26 may include respective processors and memories, one or more actuators, and may send instructions to and/or receive data from one or more sensors 22, as is known. The controllers 26 may be programmed and connected to a first vehicle 12 communications bus to receive instructions from the computer 20 and control an actuator based on such instructions. For example, an engine controller may control one or more actuators providing fuel and air to an engine, electronic spark generation for igniting fuel combustion within engine cylinders, etc. One or more sensors 22, may, e.g., detect the action of the actuators. For example, a sensor 22 may detect the position of a valve as it opens and closes to permit air or fuel into an engine cylinder.

The communications circuitry 24 may include hardware, software, firmware, etc., such as are known, and may be configured for one or more types of wireless communications. The hardware may include, e.g., one or more transceivers, one or more receivers, one or more transmitters, one or more antennas, one or more microcontrollers, one or more memories, one or more electronic components, one or more interactive circuits, etc. The software may be stored on a memory, and may include, e.g., one or more encoders, one or more decoders, etc. for converting messages from one protocol to another protocol. Some functions, e.g., encoding functions, may be realized via firmware.

The types of wireless communications may include WiFi communications, dedicated short range communications (DSRC), long term evolution direct (LTE-D), two-way satellite communications (e.g., emergency services), one way satellite communications (e.g., receiving digital audio radio broadcasts), AM/FM radio, etc. Additionally, the communications circuitry 26 may be communicatively coupled to the computer 20 via, e.g., a wired network such as a controller area network (CAN) bus, Ethernet, or local interconnect network (LIN) bus, as is known.

The computer 20 includes a processor and a memory. The memory includes one or more types of computer-readable media, and storing instructions executable by the processor for performing various operations, including as disclosed herein. Further, the computer 20 may include and/or be communicatively coupled to one or more other computers, including e.g., vehicle components such as the sensors 22, and controllers 26, which likewise as is known may include respective processors and memories. Communications may be performed, e.g., via a controller area network (CAN) bus, Ethernet, or local interconnect network (LIN) bus, etc., as is known.

As described in additional detail below, the computer 20 may be programmed for autonomous control of the vehicle 12. The computer 20 may further, based on a determination that an operating environment is sufficiently predictable, implement an interactive Model Predictive Control methodology for the vehicle 12 that autonomously controls at least the propulsion, steering and braking of the vehicle 12.

Interactive Model Predictive Control takes into account the current and future state of the vehicle, and system operating constraints, provides an optimal control function with respect to fuel economy, drivability and performance, and is characterized in that multiple agents each of them implementing its own MPC strategy are exchanging information about their state, objective, and constraints.

A computer 20 implementing interactive Model Predictive Control for a vehicle 12 determines a control solution that optimizes a cost function for the vehicle 12 for a time period. The control solution includes instructions to control one or more of the propulsion, steering and braking of the vehicle 12. The time period includes multiple time slots. The control solution is implemented for a first time slot in the time period. Upon implementing the control solution for the first time slot, the process iterates.

In a next iteration, the computer 20 determines an updated time period. To generate the updated time period, the computer 20 removes the first time slot from the beginning of the previous time period, and adds a first additional time slot to the end of the previous time period. An updated control solution is determined for the updated time period. The updated control solution includes updated instructions to control one or more of the propulsion, steering and braking of the vehicle 12. The control solution is implemented for a second time slot, immediately following the first time slot. The process may continue to iterate, updating, the time period, determining an updated control solution for the updated time period, and implementing the updated control solution for a next time slot.

Figure 3:
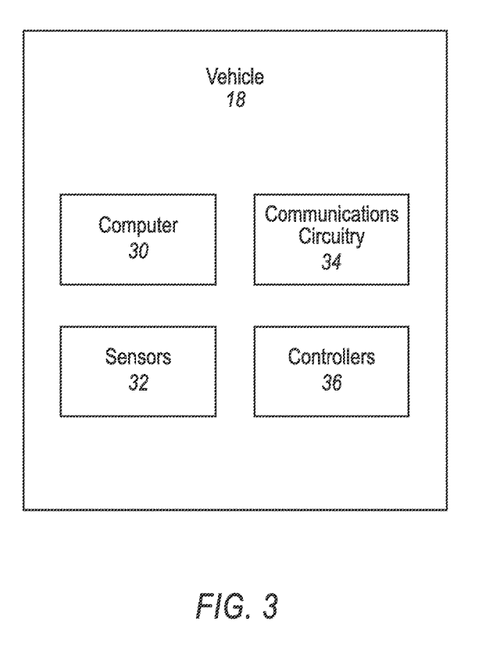
FIG. 3 is a block diagram of an exemplary second vehicle in a predetermined travel area of the first autonomous vehicle.

As shown in FIG. 3, the second vehicles 18 include a computer 30, sensors 32, communications circuitry 34 and controllers 36. The sensors 32 controllers, communications circuitry 34 and controllers 36 may be similar respectively to the sensors 22, communications circuitry 24 and controllers 26 as described with regard to first vehicle 12. The computer 30 of the second vehicles 18 may be programmed for autonomous, semi-autonomous or conventional operation of the second vehicles 18. As described in additional detail below, the second vehicle 18 computer 30 may be programmed to provide models, rules, control methodologies and/or data related to the operation of the second vehicle 18 to the first vehicle 12 computer 20, such the first vehicle 12 computer 20 may predict the behavior of the second vehicle 18. Still further, in the case of autonomous or semi-autonomous operation of the second vehicle 18, the computer 30 may be programmed to adjust the control of the second vehicle 18 based on models, rules, control methodologies and data related to the operation of the first vehicle 12, and to provide instructions to the second vehicle 18 controllers 36 based on the adjusted control.

Interactive Model Predictive Control

Interactive Model Predictive Control (iMPC) is a control methodology which may be used for the control of autonomous vehicles such as first vehicle 12 of system 10. In the case that one or more second vehicles 18 are autonomous, the second vehicles 18 that are autonomous may also be programmed to implement iMPC. In this case, the first vehicle 12 and the second vehicles 18 that are programmed to implement iMPC may, as described below, collectively establish an iMPC multivehicle system with interactive control. The multivehicle system might balance the control goals of the first vehicle 12 with the control goals of the second vehicle 18 through each individual iMPC controller. For instance, if the first vehicle 12 needs to get off a highway through passing second vehicles 18, the second vehicles 18 on the right side of the first vehicle 12 might need to slow down or keep operating at quasi-steady states to avoid sudden motion changes which might cause disturbance to the first vehicle 12 intended to get off a highway.

A computer 20 implementing iMPC can take into account the current and future state of the first vehicle 12, and the system operating constraints, and provide an optimal control function. The optimal control function may receive as inputs, e.g., a destination for the first vehicle 12 and a desired travel speed, etc. (collectively, vehicle goals). The first vehicle 12 may additionally receive system operating constraints. System operating constraints may be, for example, the available roads, driving rules and regulations, speed limits, traffic, obstacles, etc. The iMPC generates, based on the vehicle goals, and system operating constraints, instructions for actuators controlling propulsion, steering and braking of the first vehicle 12. The instructions may be generated such that operation of the first vehicle 12 is optimized to achieve the vehicle goals, and further to achieve. e.g., one or a combination of optimal fuel economy, optimal drivability (for example smoothness of ride), and optimal performance (for example, minimal adjustments to actuators).

A critical assumption in the design of iMPC for the autonomous vehicle 12 is the capability of the control system to predict a first vehicle performance along a next segment of a travel path. The next segment of the travel path will be referred to herein as a preview horizon. The preview horizon may be, for example, the segment of the travel path that the vehicle 12 will travel for a next predetermined time period. The next predetermined time period may be, for example, an absolute time such as 10 seconds, or, as another example, a predetermined number of time slots for example, 100, wherein each time slot represents one cycle of receiving inputs by the computer 20 and providing updated instructions to the controller 26. The predetermined time period may vary based on the operating environment. For example, a predetermined time period in a city may be 1 second and a predetermined time period on a highway may be 10 seconds.

Figure 4:
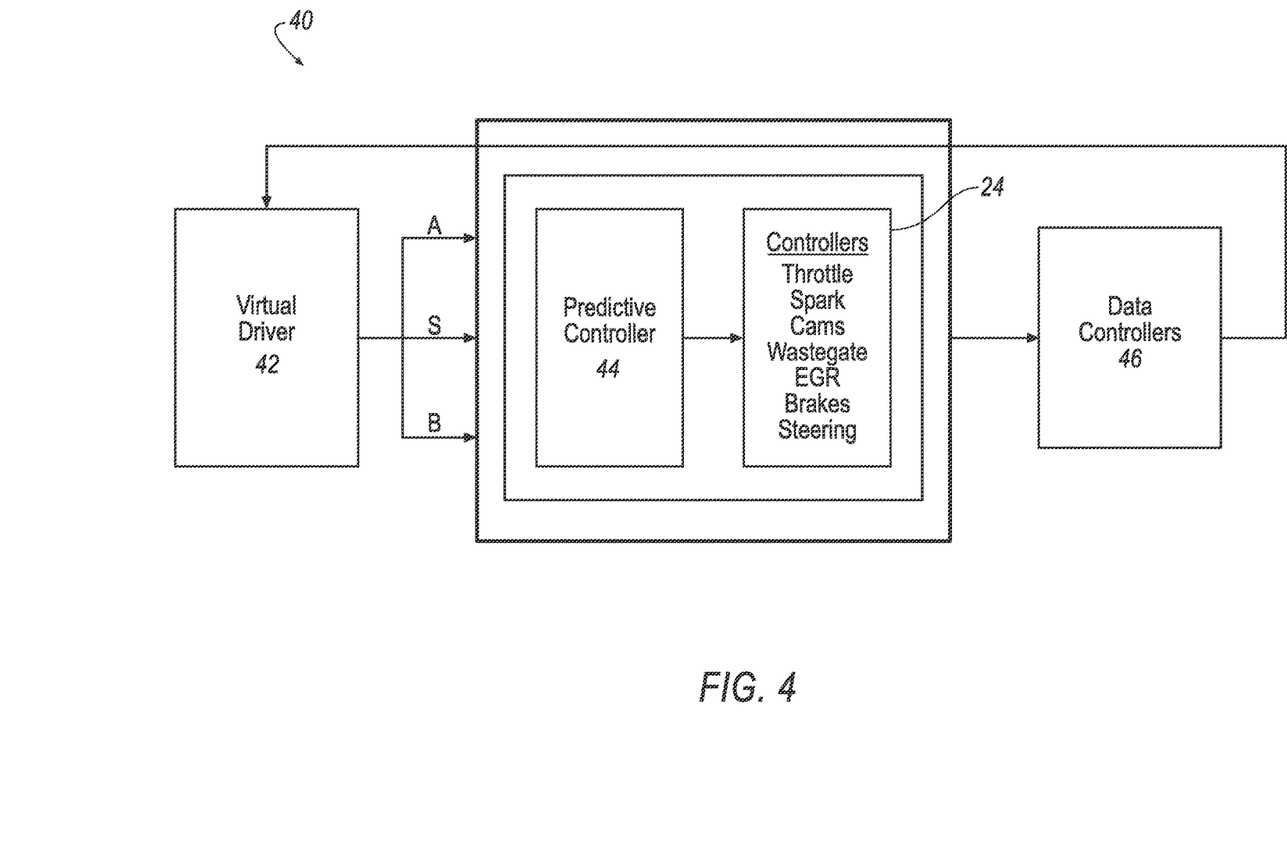
FIG. 4 is a block diagram of an exemplary control loop for implementing iMPC.

A block diagram of a control loop 40 for implementing iMPC is shown in FIG. 4. The iMPC control loop 40 includes a virtual driver 42, a predictive controller 44, one or more controllers 26, and one or more data collectors 18, 22, 32.

The virtual driver 42 and predictive controller 44 may be, for example, software modules that may be executed by the computer 20 of the first vehicle 12.

The virtual driver 42 may perform deterministic path planning and path following algorithms that enable the prediction of vehicle speed and position over the preview horizon. The virtual driver 42, may receive data that includes, e.g., a destination, map data, traffic data, etc. Based on the received data, the virtual driver 42 may generate, e.g., accelerator, steering and braking inputs to the predictive controller. The accelerator input may indicate a target acceleration for the first vehicle 12. The steering input may indicate a target steering angle. The brake input may indicate a target level of braking.

The predictive controller 44 may receive, for example, the accelerator, steering and braking inputs from the virtual driver 42. Based on these inputs, the predictive controller 44 may generate instructions for the first vehicle 12 controllers 26 related to propulsion, steering and braking. For example, the predictive controller 44 may send an instruction to a steering controller 26 to adjust a steering angle by 0.25 degrees, or to a braking controller 26 to increase a brake fluid pressure by 1 bar.

In a condition where a collision becomes a concern, accident avoidance or mitigation functions will be activated independent of the virtual driver's intent. Upon the activation of the accident avoidance and mitigation control actions, the virtual driver 42 needs to coordinate with the accident avoidance/mitigation control action so as to not reduce the effectiveness of the safety functions. As in the case of a vehicle 12 being driven manually, the virtual driver 42 might not need to manage the safety functions of electronic stability control, roll stability control, traction control, and anti-lock-braking. However, the virtual driver 42 must take measures to coordinate with, and not to generate control actions that counteract those safety functions.

As described above, the controllers 26 may include respective processors and memories, one or more actuators, and may send instructions to and/or receive data from one or more sensors 22, as is known. The controllers 26 may be programmed and connected to a first vehicle 12 communications bus to receive instructions from the computer 20 and control an actuator based on such instructions. For example, also as described above, an engine controller 26 may control one or more actuators providing fuel and air to an engine, electronic spark generation for igniting fuel combustion within engine cylinders, etc. One or more sensors 22, may, e.g., detect the action of the actuators. For example, a sensor 22 may detect the position of a valve as it opens and closes to permit air or fuel into an engine cylinder.

Controllers 26 may include one or more throttle controllers 26, one or more spark controllers 26, one or more brake controllers 26, one or more steering controllers 26, an exhaust gas recycling (EGR) controller 26, a waste gate controller 26, etc.

The data collectors 46 may include first vehicle 12 sensors 22, second vehicle 18 sensors 32, and data sources 16. The data collectors 46 may collect data regarding the environment such as presence and location of roads, the position of the first vehicle 12 on the roads, the presence and location of vehicles 18 in the area of operation, the speed and direction of travel of the vehicles 18 in the area of operation, the type of vehicle 18, pedestrians, obstacles in the road, etc. The data collectors 46 may further provide data related to the operation of the first vehicle 12 such as speed, direction of travel, engine speed, steering angle, braking pressure, etc. Still further, data collectors 46 may collect data related to weather conditions in the area of operation, geo-coordinates (latitude, longitude) of the first vehicle 12, traffic conditions in the area of operation, traffic conditions along a planned travel path beyond the area of operation, etc., that may be used, e.g., by the virtual driver 42 to generate updated accelerator, steering and braking inputs to the predictive controller.

As discussed above, the iMPC may optimize first vehicle 12 with regard to destination, speed of travel, fuel economy, drivability, performance, etc. As one example, the iMPC may adjust parameters to minimize a cost function J. The cost function J may quantify a plurality of costs, and may be, e.g., an equation including a number of terms, each of which the first vehicle 12 computer 20 may seek to minimize, and/or may seek to minimize in aggregate. Equation 1 below is an example of a cost function J.

$$J = \alpha_1 \Sigma_{i=1}^{N}(P_i - p_i)^2 + \alpha_2 \Sigma_{i=1}^{N}(V_i - v_i)^2 + \alpha_3 \Sigma_{i=1}^{N} \dot{m}_{fi} + \alpha_4 \Sigma_{i=1}^{N} \partial T_i^2 + \beta \Sigma_{i=1}^{N} \partial u^2$$ Eqn. 1

$$u_{opt} = \min_u J$$ Eqn. 2

Subject to:

$$\dot{x} = f(x,u)$$ Eqn. 3

$$y = g(x,u)$$ Eqn. 4

$$u_{min} < u < u_{max}$$ Eqn. 5

In the above equations; J is a cost function to be minimized, $P_i$ is a target position for the first vehicle 12, also referred to herein as a destination, $p_i$ is a current position of first vehicle 12, $V_i$ is a target velocity for the first vehicle 12, $v_i$ is a current velocity of the first vehicle 12, $\dot{m}_{fi}$ is a fuel consumption rate of the first vehicle 12, T is torque, u is a set of vehicle control variables, x is a state of the first vehicle 12, y is an output of the first vehicle 12 (position, velocity, fuel consumption, ride smoothness, etc.). i is the time slot for the calculation. Referring to equation 5, the computer 20 may calculate an optimal set of vehicle control variables $u_{opt}$ such that the cost function J is minimized.

Referring again to FIG. 4, the virtual driver 42 may include path planning and path following algorithms. As described above, the virtual driver 42 may be a software module included in the computer 20.

Based on inputs from, e.g., a user of the first vehicle 12, the virtual driver 42 may determine a path from a current location to a desired destination (the travel path), and a desired velocity of travel. Based on the travel path, and the position of the first vehicle 12 relative to the path, the virtual driver 42 may calculate acceleration, a steering angle, and a braking to be applied by the first vehicle 12. The virtual driver 42 may supply the acceleration, steering angle and braking inputs to the predictive controller.

The predictive controller 44 may include one or more algorithms for determining control variables u based on the acceleration, steering angle and braking inputs received from the virtual driver. For example, the predictive controller 44 may generate a set of control variables u such that the cost function J according to equation 1 is minimized according to the equation 2.

The predictive controller 44 may then generate a set of instructions for the controllers 26. The instructions may provide updated values of control variables u to the controllers 26. The controllers, based on the updated control variables u, may adjust the operation of one or more actuators associated with the controllers 26. Based on the instructions to the actuators, the first vehicle 12 may change its position, velocity, and direction of travel.

Data collectors 46, which may include first vehicle 12 sensors 22, vehicle 18 sensors 32 and data sources 16 may, based on the new position, velocity, and direction of travel of the first vehicle 12, provide updated data to the virtual driver 42. The virtual driver 42 may then make adjustments consistent with the planned path and velocity.

Processes
Determining a Travel Path

The first vehicle 12 computer 20 collects data indicating first vehicle goals, for example, for a trip. The data may include, for example, a target location (destination) for the trip, and a target velocity for the trip. The target velocity may be, for example, a target overall average velocity for the trip, and may be associated with, for example rules, such as a target of remaining within a range of posted speed limits. The range may be, for example, within +/−10% of posted speeds, within an absolute range of +/−5 miles/hour of posted speeds, etc.

The computer 20 may further collect, for example map data from memory associated with the computer 20 or from a data source 16, indicating possible routes from a current location to the destination. The computer 20, may, determine, according to known algorithms, a travel path from the current location to the destination.

Determining a Preview Horizon

Based on the determined travel path, the vehicle 12 computer 20 may identify a preview horizon. As described above, the preview horizon may be, for example, a segment of the travel path that the vehicle 12 will travel for a next predetermined time period. The next predetermined time period may be, for example, an absolute time such as 10 seconds, or, as another example, a predetermined number of time slots for example, 100, wherein each time slot represents one cycle of receiving inputs by the computer 20 and providing updated instructions to the controller 26. The predetermined time period may vary based on the operating environment. For example, a predetermined time period in a city may be 1 second and a predetermined time period on a highway may be 10 seconds.

Determining a Travel Area

A travel area may be an area surrounding the preview horizon. In order to implement interactive Model Predictive Control (iMPC), the vehicle 12 computer 20 may need data indicating environment conditions, traffic conditions, road conditions, etc. within the predetermined travel area. The predetermined travel area may be defined, e.g., as along the preview horizon, within a predetermined distance of the first vehicle 12 at each point. The predetermined travel area may vary, for example, based on the environment and type of operation. For example, when the first vehicle 12 is operating in a city, and travelling slowly along city streets, the predetermined travel area may be 50 meters in front and behind the first vehicle 12 and 20 meters to the left and to the right of the first vehicle 12. When, on the other hand, the first vehicle 12 is operating on a highway, the predetermined travel area may be 500 meters in front and behind the first vehicle 12, and extend 50 meters beyond the sides of the highway to the left and right.

Collecting Data Related to Objects in the Travel Area

In order to determine a level of predictability of the predetermined travel area, the computer 20 collects data related to road conditions, weather conditions, traffic conditions, etc. within the predetermined travel area. The computer 20 may, for example, collect data from data sources 16 such as weather tracking systems, traffic tracking systems, map providers, global positioning systems, etc. Additionally, the computer 20 may collect data from sensors 22 included in or communicatively coupled to the computer 20. Still further, the computer 20 may collect data from sensors 32, via, for example, second vehicle 18 computers 30.

In addition to road conditions, weather conditions, traffic conditions, etc., the computer 20 may collect data related to objects in the predetermined travel area. The objects may include animate objects such as people and animals, and may further include inanimate objects. Inanimate objects may include stationary objects such as roads, signs, buildings, etc., and may further include moving objects such as bicycles, second vehicles 18, etc.

The computer 20 may further, via communications with each second vehicle 18 computer 30, determine a type of operation, of each of the second vehicles 18. A type of operation may be, e.g., autonomous operation based on interactive Model Predictive Control, autonomous operation based on a different control model, semi-autonomous operation, or manual (human) operation. In the case that the second vehicle 18 is operating autonomously, the computer 20 may request additional information, such as the current set of goals (cost function) for the second vehicle 18, the type of autonomous control, the rules governing the autonomous control, etc.

Similarly, in the case of a second vehicle 18 operating semi-autonomously, the computer 20 may request additional information, such as the types of semi-autonomous control (anti-lock braking system (ABS), traction control, collision avoidance, etc.), which may provide an indication of the future behavior of the second vehicle 18.

The computer 20 may further collect, from sensors 22, sensors 32, and data sources 16, data indicating a behavior of each of the second vehicles 18 in the predetermined travel area. The data may include position as a function of time, velocity as a function of time, direction as a function of time, etc. As described below, the data may, particularly in the case of second vehicles 18 operating semi-autonomously or manually, be used to determine whether the vehicles 18 are operating within a predetermined range of behavior.

Determining a level of Predictability of the Predetermined Travel Area

In order for the first vehicle 12 to implement iMPC, it is necessary that the predetermined travel area be sufficiently predictable. The computer 20 of the first vehicle 12 may be programmed to determine, based on collected data, the predictability of the travel area. For example, the predictability of the road conditions during winter driving is less than that of the road conditions during summer driving, due to the potential ice and snow conditions on the road. As another example, the predictability of a travel area having less traffic is higher than that of traffic travel area having heavy traffic.

The presence of some objects in the travel area may render the travel area not sufficiently predictable to implement iMPC. For example, the presence of pedestrians, animals, or people riding bicycles, tricycles, etc., may indicate that the travel area is insufficiently predictable. As another example, a travel area in a residential area may be determined to be insufficiently predictable, due to the likelihood that people, pets, etc. may be present.

In other cases, additional information may be necessary to determine if an environment is sufficiently predictable. For example, on a limited access highway, the objects in the travel area may all be second vehicles 18, travelling in a same direction. In this case, the travel area may be sufficiently predictable in a case that the behavior of each of the other vehicles 18 is sufficiently predictable. The behavior of the other vehicles 18 may be sufficiently predictable if either the second vehicles 18 are operating autonomously or the second vehicles 18 are operating within a predetermined range of behavior.

The computer 20 may be programmed to utilize a numeric method for determining the level of predictability of the travel area. For example, the computer 20 may identify a set of risk factors. A sample of a risk factor might be rain, snow, darkness, a residential area, presence of pets, presence of children, presence of adults, presence of bicycles, presence of second non-autonomous vehicles 18, presence of autonomous vehicles 18, etc. Each risk factor may be assigned a numeric value, and the sum of the numeric risk factor values determined. A sum of the numeric risk factors above a threshold level may indicate that the travel area is insufficiently predictable.

Determining a Predetermined Range of Behavior

A predetermined range of behavior for each second vehicle 18 may be determined, for example, based on statistical data related to the behavior of vehicles 18 in a particular driving situation. For example, the predetermined range of behavior may be determined based on recorded data for vehicles driving in the travel area.

As an example, the travel area may be a limited access highway with a speed limit of 70 miles/hour. Based on statistical data, the predetermined range of speeds in the predetermined travel area may be, e.g., 50 miles/hour to 85 miles/hour. The range of predictable positions may be within 10 meters of either side of the highway, and spending greater than a predetermined percentage of time, for example, 80%, within the defined lanes.

There may be additional limitations to be within the predetermined range of behaviors. For example, in order to be within the predetermined range of behavior, each second vehicle 18 may be required to maintain a minimum distance (e.g., 20 meters) to the first vehicle 12 and other second vehicles 18 for a certain percentage of the time (e.g., 80%), and may be required to execute lane change maneuvers in a time that is greater than a minimum time (e.g., 10 seconds) and less than a maximum time (e.g. 1 minute).

The range of predicted behaviors may depend on weather conditions, light conditions, the volume of traffic, the time of day, etc. For example, the predetermined range of speeds may be reduced in rainy or snowy weather. The range of predetermined distances may be reduced in high volume traffic conditions, such as during rush hour in the morning and evening.

Establishing an iMPC Multivehicle System with Interactive Control

In a case that one or more second vehicle 18 computers 30 within the travel area are programmed for interactive Model Predictive Control based autonomous control, the first vehicle 12 computer 20 and the one or more second vehicle 18 computers 30 may form a multivehicle system implementing interactive Model Predictive Control. The first vehicle 12 computer 20 and one or more second vehicle 18 computers 30 may exchange respective goals (cost functions), models, rules, control methodologies and/or data. The computer 20 and one or more computers 30 may collaborate to control the respective first vehicle 12 and second vehicles 18 to obtain an optimal result for the multivehicle system so as to achieve the optimized collaborative control of the vehicles 12, 18. For example, the multivehicle system might form a platooning group to follow the leading autonomous vehicle 12.

Exemplary Process Flow

Figure 5A:
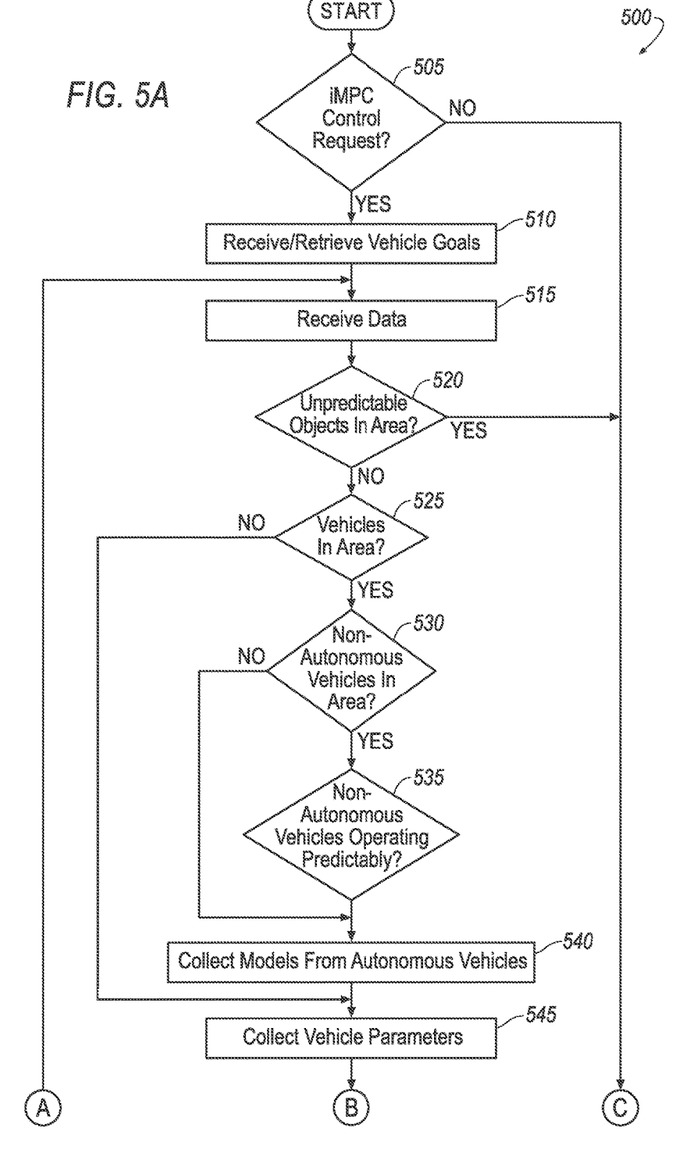
FIG. 5A is a first portion of a diagram of an exemplary process for implementing iMPC for the first autonomous vehicle.
Figure 5B:
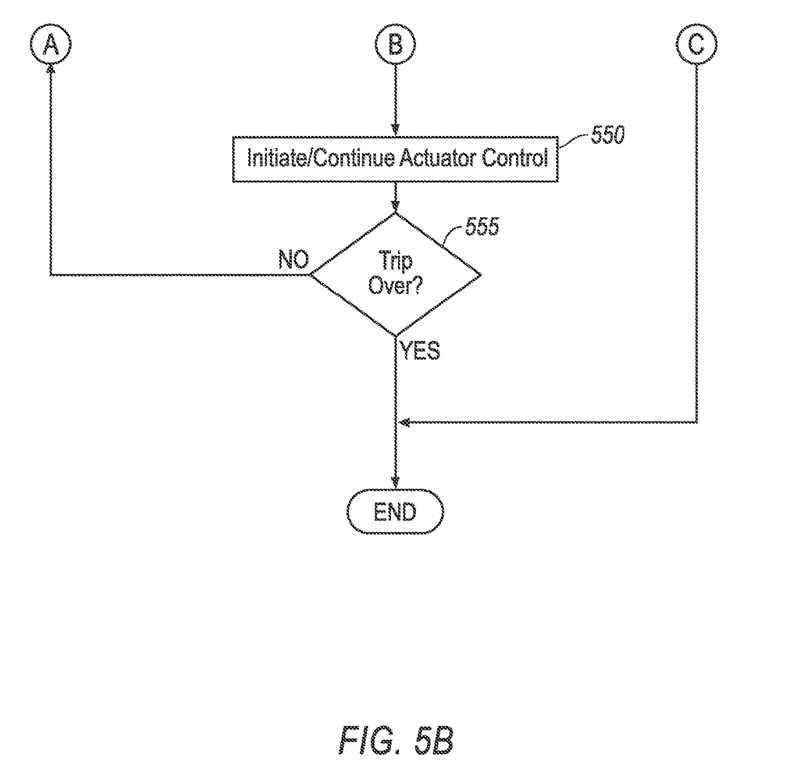
FIG. 5B is a second portion of the diagram of the exemplary process for implementing iMPC for the first autonomous vehicle.

FIG. 5 is a diagram of an exemplary process 500 implementing iMPC by the first autonomous vehicle 12. The process 500 starts in a block 505.

In the block 505, the computer 20 of the first vehicle 12 determines whether the computer 20 has received a request to implement integrative Model Predictive Control. The iMPC request may be, for example, input from the first vehicle 12 user indicating that the user would like the first vehicle 12 to operate according to iMPC.

The iMPC request may occur, for example, while the first vehicle 12 is already being operated. The vehicle 12 may be, for example, being driven, or being autonomously operated according to another (non- iMPC) control algorithm. For example, while on a highway, while being driver or being autonomous operated according to the non-iMPC control algorithm, the user may request, for example by pushing a button that the first vehicle 12 switch to iMPC operation.

Other requests for iMPC operation may be recognized. For example, the computer 20 may be programmed to assume iMPC operation, and recognize an ignition event as a request to initiate autonomous control according to iMPC. As another example, the computer 20 may receive via the communications circuitry 24, for example from an authorized user, a request for the first vehicle 12 to operate autonomously according to iMPC. For example, a user may summon the first vehicle 12 to come pick the user up at a specified location, via WiFi communications over the network 14.

In the case that the first vehicle 12 computer 20 recognizes a request to operate according to iMPC, the process 500 continues in a block 510. Otherwise, the process 500 ends.

In the block 510, the computer 20 receives or retrieves first vehicle 12 goals. The goals may be received, for example, as input from the user indicating a target location (destination) and a target velocity for the first vehicle 12. In some cases, for example, when the first vehicle 12 is requested to switch to iMPC operation while travelling on a highway, the computer 20 may determine a default set of goals. For example, the computer 20 may determine that the vehicle 12 should continue along the highway, at a speed compatible with the speed of surrounding traffic. In other cases, when transitioning from a first type of autonomous control to iMPC, the computer 20 may retrieve the vehicle goals from the first type of autonomous control for use with iMPC. In yet other cases, the computer 20 may receive an instruction, for example, "Go to Sarah's school", and the computer 20 may retrieve from storage a location for Sarah's school, and a default velocity goal, for example, to travel at posted speeds, or 5 miles/hour above posted speeds, or at the speed of traffic, etc. When the computer 20 has received travel goals for the first vehicle 12, the process 500 continues in a block 515.

In the block 515, the computer 20 receives data related to the environment in which the first vehicle 12 is operating. For example, the computer 20 may determine, based on the goals for the first vehicle 12, the travel path. The computer 20 may collect, from, e.g., data sources 16, information related to the environment along the travel path. The information may indicate, for example, road conditions, weather conditions, traffic conditions, etc., along the travel path.

The computer 20 may further, based on the travel path, determine or update a preview horizon. As discussed above, for example, the preview horizon may be the segment of the travel path the first vehicle 12 will travel for a next predetermined period of time. The next predetermined period of time may be, for example, an absolute time such as 10 seconds, or, as another example, a predetermined number of time slots for example, 100, wherein each time slot represents one cycle of receiving inputs by the computer 20 and providing updated instructions to the controller 26. The predetermined period of time may vary based on the operating environment. For example, a predetermined time period in a city may be 1 second and a predetermined time period on a highway may be 10 seconds.

The first vehicle 12 may receive, e.g., from sensors 22 included in or communicatively coupled with the first vehicle 12, data regarding a predetermined travel area surrounding the preview horizon. The predetermined travel area may be defined, e.g., as along the preview horizon, within a predetermined distance of the first vehicle 12. The predetermined travel area may vary, for example, based on the environment and type of operation. For example, when the first vehicle 12 is operating in a city, and travelling slowly along city streets, the predetermined travel area may be 50meters in front and behind the first vehicle 12 and 20 meters to the left and to the right of the first vehicle 12. When, on the other hand, the first vehicle 12 is operating on a highway, the predetermined travel area may be 500 meters in front and behind the first vehicle 12, and extend 50 meters beyond the sides of the highway to the left and right. The data may indicate whether second vehicles 18 are present, pedestrians are present, pets or other free roaming animals are present, etc.

In the case that one or more second vehicles 18 are present within the predetermined travel area, the computer 20 may establish communications with the second vehicles 18. The computer 20 may inquire, from the computer 30 in each of the second vehicles 18, whether each of the second vehicles 18 is operating autonomously, or is being controlled by a driver.

The computer 20 may further collect information, for example from sensors 22, or from sensors 32 included in or communicatively coupled with the second vehicles 18, related to the driving behavior of the second vehicles 18.

Upon collecting data related to the predetermined travel area by the computer 20, the process 500 continues in a block 520.

In the block 520, the computer 20 determines whether there are pedestrians, bicycles in operation, animals, within the predetermined travel area.

In the case that the computer 20 determines that there are no unpredictable objects such as pedestrians, bicycles in operation, and/or animals in the predetermined travel area, the process 500 continues in a block 525. In the case that the computer 20 determines that there are one or more unpredictable objects in the predetermined travel area, the process 500 ends. For example, the vehicle 12 may resume or continue autonomous operation based on a non-iMPC control algorithm, or may continue or return to manual control.

In the block 525, the computer 20 determines whether there are second vehicles 18 in the predetermined travel area for the first vehicle 12. In the case that the computer 20 identifies vehicles 18 in the predetermined travel area, the process 500 continues in a block 530. In the case that the computer 20 determines that there are no vehicles 18 in the predetermined travel area, the process 500 continues in a block 545. In a case that the computer 20 determines that there are second vehicles 18 in the travel area, the process 500 continues in a block 530.

In the block 530, the computer 20 determines, based on the data collected in the block 515, whether one or more of the second vehicles 18 in the predetermined travel area are operating non-autonomously. In the case that one or more of the second vehicles 18 is operating non-autonomously, the process 500 continues in a block 535. In the case that all of the second vehicles 12 are operating autonomously, the process 500 continues in a block 540.

In the block 535, the computer 20 determines, for each of the one or more second vehicles 18 operating non-autonomously, whether the second vehicle 18 is operating predictably, i.e., within a predetermined range of behaviors.

The computer 20 may initially, identify a predetermined range of behaviors which are sufficiently predictable for the second vehicles 18. The predetermined range of behaviors may depend, e.g., on the driving environment. For example, when travelling on a limited access highway, the predetermined range of behaviors may include operating within a range of velocities with respect to the traffic condition or the predefined speed limit, maintaining a minimum distance from the first vehicle 12 and other second vehicles 18, remaining within a minimum distance of a center of a lane except when not changing lanes, responding to driving condition changes in a predetermined range of responsiveness (e.g., response in less than a predetermined period of time) and a predetermined range of smoothness (e.g., latitudinal and longitudinal accelerations, decelerations within predetermined ranges), operating the vehicle in alignment with the safety rules, etc. When travelling in a suburban environment, the predetermined range of behaviors may include travelling at or below a maximum speed, acceleration below a maximum acceleration, stopping at stop signs, rates change of the vehicle motion are within a predetermined range, etc. A necessary condition for the first vehicle 12 to implement iMPC is that all second vehicles 18 within the predetermined travel area are operating within the predetermined range of behaviors. In the case that the computer 20 determines that each of the non-autonomous second vehicles 18 is operating within the predetermined range of behaviors, the process 500 continues in a block 540.

In the case that the computer 20 determines that one or more of the second vehicles 18 are operating outside of the predetermined range, the process 500 ends. The vehicle 12 computer 20 may resume or continue autonomous operation based on a non-iMPC control algorithm, or may continue or resume to be controlled by a driver (manual control).

In the block 540, the computer 20 collects models, rules, goals (cost functions), control methodologies, data etc., of the one or more second vehicles 18 that are operating autonomously. The process 500 continues in a block 545.

In the block 545, the computer 20 collects operating state data for the first vehicle 12. For example, the computer 20 may collect data related to vehicle velocity, vehicle direction of travel, vehicle acceleration and vehicle position. The computer 20 may further collect data related to the operating state of vehicle 12 components such as the engine speed, transmission ratio, brake fluid pressure, coolant temperature, etc. The data may be collected from sensors 22 communicatively coupled with the computer 20, and may further be collected from data sources 16. When the computer 20 has collected the operating state data for the first vehicle 12, the process 500 continues in a block 550.

In the block 550, the computer 20 initiates or continues iMPC for the first vehicle 12.

In the case that there are no pedestrians or second vehicles 18 in the predetermined area of travel, the computer 20 may implement iMPC to generate operating variables for the first vehicle 12 based on the goals for the first vehicle 12 as received in the block 510 and data related to the environment as received in the block 515 and data related to the first vehicle operating state as collected in the block 545.

In the case that there are second vehicles 18 in the predetermined area, the computer 20 also takes into account the operation of the second vehicles 18. In the case that one or more of the second vehicles 18 is operating autonomously, the computer 20 determines, based on the models, rules, goals, etc. received from the second vehicle 18, the predicted future behavior of the second vehicle 18. For second vehicles 18 that are not operating autonomously, the computer 20 assumes that each of the second vehicles 18 that is not operating autonomously will continue to operating within the predetermined range of behaviors identified for the particular second vehicle 18. In this case, the computer 20 includes the second vehicle 18 data collected in the blocks 535 and 540 when generating the first vehicle 12 operating variables.

Upon generating the first vehicle 12 operating variables, the computer 20 may send instructions including the operating variables to the one or more controllers 26 in the first vehicle 12. The controllers 26 may, based on the operating variables, control actuators, such that, e.g., propulsion, a steering angle, a braking, a suspension, etc., of the first vehicle 12 are controlled.

As described above, during a first iteration, the computer 20 implements the instructions for a first time slot of the predetermined time period. For following iterations, the computer 20 implements updated instructions for the time slot immediately following the previous time slot for which instructions were implemented. The process continues in a block 555.

In the block 555, the computer 20 determines whether the trip is over. For example, the computer 20 may receive data indicating that the vehicle 20 has arrived at the destination. As another example, the computer 20 may detect that the first vehicle 12 has been parked and turned off. In the case that the computer 20 determines that the trip is over, the process 500 ends.

CONCLUSION

Computing devices such as those discussed herein, which can be operated in various real-time or embedded environments (RT-Linux, VxWorks, RTX, TI-RTOS, etc.) and various communication protocols (CAN, FelxRay, LCM UDP, etc.), generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system comprising a computing device including a processor and a memory, the memory storing instructions executable by the processor such that the processor is programmed to:
   receive a set of goals for a first vehicle operating in an autonomous mode;
   identify, based on the set of goals, a travel area for the first vehicle for a next predetermined time period, the predetermined time period including a plurality of time slots;
   receive data indicating a first level of predictability of driving conditions of the identified travel area, the data including an indication of one or more objects and a behavior of the one or more objects, wherein the one or more objects includes one or more second vehicles;
   determine, based on the received data, that the first level of predictability of driving conditions is sufficient to control the first vehicle according to model predictive control, further based on determining that a level of predictability of each of the one or more objects within the travel area is within a predetermined range including determining that each of the second vehicles is operating autonomously; and
   control the first vehicle according to interactive model predictive control including:
      determining, for the predetermined time period, a control solution, the control solution including instructions to control each of the actuators related to the steering, propulsion and braking of the first vehicle such that a cost function associated with the set of goals is minimized;
      implementing the control solution for a first time slot at a beginning of the predetermined time period;
      updating the predetermined time period to remove the first time slot and include first additional time slot at an end of the predetermined time period;
      determining, for the updated predetermined time period, an updated control solution, the updated control solution including instructions to control each of the actuators related to the steering, propulsion and braking of the first vehicle such that the cost function for the first vehicle associated with the set of goals for the first vehicle is minimized; and
      implementing the updated control solution for a second time slot, immediately after the first time slot.

2. The system of claim 1, wherein the model of interactive model predictive control takes into account a current and a future state of the first vehicle and operating constraints of the first vehicle.

3. The system of claim 1, wherein determining the control solution includes optimizing at least one of fuel economy, drivability and performance.

4. The system of claim 1, wherein the data indicating the first level of predictability of driving conditions includes at least one of weather data and road condition data.

5. The system of claim 1, wherein the processor is further programmed to:
   receive, from each of the second vehicles operating autonomously, data indicating a future driving behavior of the respective second vehicle; and wherein the determination of the control solution takes into account the data indicating future driving behavior of the respective second vehicle.

6. The system of claim 1, wherein the processor is further programmed to:
   receive, from at least one of the second vehicles operating autonomously, a set of goals for the second vehicle, and wherein determining the control solution for the first vehicle takes into account the set of goals of the second vehicle.

7. The system of claim 6, wherein taking into account the set of goals of the second vehicle includes determining a balance of the goals of the first vehicle and the goals of the second vehicle.

8. The system of claim 1, wherein determining that the level of predictability of each of the objects within the predetermined travel area is within a predetermined range includes determining that none of the objects within the predetermined area of travel is a vehicle.

9. The system of claim 1, wherein the processor is further programmed to:
   receive, after determining the first control solution, additional data indicating a second level of predictability of the driving conditions;
   determine that the second level of predictability of driving conditions is not sufficient to control the first vehicle according to interactive model predictive control; and
   control the first vehicle according to an alternative control algorithm.

10. The system of claim 1, wherein at least one second vehicle includes a second computing device including a second processor and a second memory, the second memory storing instructions executable by the second processor such that the second processor is programmed to:

receive a set of goals for the second vehicle;
receive, data from the first vehicle indicating the set of goals for the first vehicle; and
control the second vehicle according to interactive model predictive control including:
determining, for the predetermined time period, a control solution for the second vehicle, the control solution including instructions to control each of the actuators related to the steering, propulsion and braking of the second vehicle such that a cost function associated with the set of goals for the first vehicle and the set of goals for the second vehicle is minimized;
implementing the second control solution for the second vehicle for the first time slot.

11. A method comprising:
receiving, by a computing device a set of goals for a first vehicle operating in an autonomous mode;
identifying, based on the set of goals, a travel area for the first vehicle for a next predetermined time period, the predetermined time period including a plurality of time slots;
receiving data indicating a first level of predictability of driving conditions of the identified travel area, the data including an indication of one or more objects and a behavior of the one or more objects, wherein the one or more objects includes one or more second vehicles;
determining, based on the received data, that the first level of predictability of driving conditions is sufficient to control the first vehicle according to model predictive control, further based on determining that a level of predictability of each of the one or more objects within the travel area is within a predetermined range including determining that each of the second vehicles is operating autonomously; and
controlling the first vehicle according to interactive model predictive control including:
determining, for the predetermined time period, a control solution, the control solution including instructions to control each of the actuators related to the steering, propulsion and braking of the first vehicle such that a cost function associated with the set of goals is minimized;
implementing the control solution for a first time slot at a beginning of the predetermined time period;
updating the predetermined time period to remove the first time slot and include first additional time slot at an end of the predetermined time period;
determining, for the updated predetermined time period, an updated control solution, the updated control solution including instructions to control each of the actuators related to the steering, propulsion and braking of the first vehicle such that the cost function for the first vehicle associated with the set of goals for the first vehicle is minimized; and
implementing the updated control solution for a second time slot, immediately after the first time slot.

12. The method of claim 11, wherein the data indicating the first level of predictability of driving conditions includes at least one of weather data and road condition data.

13. The method of claim 11, further comprising:
receiving, from each of the second vehicles operating autonomously, data indicating a future driving behavior of the respective second vehicle; and wherein the determination of the control solution takes into account the data indicating future driving behavior of the respective second vehicle.

14. The method of claim 11, further comprising:
receiving, from at least one of the second vehicles operating autonomously, a set of goals for the second vehicle, and wherein determining the control solution for the first vehicle takes into account the set of goals of the second vehicle.

15. The method of claim 14, wherein taking into account the set of goals of the second vehicle includes determining a balance of the goals of the first vehicle and the goals of the second vehicle.

16. The method of claim 11, further comprising:
receiving, after determining the first control solution, additional data indicating a second level of predictability of the driving conditions;
determining that the second level of predictability of driving conditions is not sufficient to control the first vehicle according to interactive model predictive control; and
controlling the first vehicle according to an alternative control algorithm.

17. The method of claim 11, further comprising:
receiving, by a second computing device, a set of goals for a second vehicle;
receiving, by the second computing device, data from the first vehicle indicating the set of goals for the first vehicle; and
controlling, by the second computing device, the second vehicle according to interactive model predictive control including:
determining, for the predetermined time period, a control solution for the second vehicle, the control solution including instructions to control each of the actuators related to the steering, propulsion and braking of the second vehicle such that a cost function associated with the set of goals for the first vehicle and the set of goals for the second vehicle is minimized;
implementing the second control solution for the second vehicle for the first time slot.

18. The system of claim 1, wherein determining, based on the received data, that the first level of predictability of driving conditions is sufficient to control the first vehicle according to model predictive control includes programming to:
identify a set of risk factors in the travel area; and
assign a numeric value to each risk factor in the set of risk factors.

* * * * *